United States Patent [19]

Ruozi

[11] Patent Number: 5,750,966
[45] Date of Patent: May 12, 1998

[54] PLANT FOR PASTEURIZING OR STERILISING SOLID OR LIQUID FOOD PRODUCTS USING MICROWAVES

[75] Inventor: Giuseppe Ruozi, Reggio Emilia, Italy

[73] Assignee: O.M.A.C. Societa per Azioni, Reggio Emilia, Italy

[21] Appl. No.: 756,188

[22] Filed: Nov. 25, 1996

Related U.S. Application Data

[63] Continuation of Ser. No. 353,174, Dec. 8, 1994, abandoned.

[30] Foreign Application Priority Data

Dec. 9, 1993 [IT] Italy ................ MO93A0155

[51] Int. Cl.⁶ ................................. H05B 6/78
[52] U.S. Cl. ............... 219/692; 219/686; 219/693; 219/697; 219/710; 219/701; 422/21; 99/DIG. 14
[58] Field of Search ........................... 219/692, 693, 219/690, 687, 701, 686, 710, 697; 422/21; 426/107, 234, 243; 99/DIG. 14, 451

[56] References Cited

U.S. PATENT DOCUMENTS

| | | | |
|---|---|---|---|
| 3,335,253 | 8/1967 | Jeppson et al. | 219/10.55 |
| 3,611,582 | 10/1971 | Hamid et al. | 219/710 |
| 3,889,009 | 6/1975 | Lipoma | 426/234 |
| 3,961,569 | 6/1976 | Kenyon et al. | 99/451 |
| 4,294,858 | 10/1981 | Moule | 219/693 |
| 4,358,652 | 11/1982 | Kaarup | 219/697 |
| 4,388,511 | 6/1983 | Sander et al. | 219/693 |
| 4,714,812 | 12/1987 | Haagensen et al. | 219/701 |
| 4,962,298 | 10/1990 | Ferrari et al. | 219/10.55 A |
| 5,066,503 | 11/1991 | Ruozi | 426/234 |
| 5,074,200 | 12/1991 | Ruozi | 99/451 |
| 5,122,633 | 6/1992 | Moshammer et al. | 219/686 |
| 5,283,033 | 2/1994 | Dodrill | 422/21 |

FOREIGN PATENT DOCUMENTS

| | | | |
|---|---|---|---|
| 0 344 408 | 12/1989 | European Pat. Off. | A23L 3/00 |
| 0 347 623 | 12/1989 | European Pat. Off. | A23L 3/00 |
| 0 350 564 B1 | 1/1990 | European Pat. Off. | A23L 3/00 |
| 1 351 489 | 5/1964 | France . | |
| 1 571 833 | 6/1969 | France | A23L 3/00 |
| 2 107 422 | 5/1972 | France | A23L 3/00 |
| 2 107 423 | 5/1972 | France | A23L 3/00 |
| 2 432 845 | 3/1980 | France | A23L 3/30 |
| 2 547 732 | 12/1984 | France | A61L 2/02 |
| 9 201 232 | 2/1994 | Netherlands | A23L 3/02 |
| 584703 | 2/1980 | U.S.S.R. | 219/701 |
| 92 02150 | 2/1992 | WIPO | A23L 3/00 |

*Primary Examiner*—Philip H. Leung
*Attorney, Agent, or Firm*—Fenwick & West LLP

[57] ABSTRACT

A plant for pasteurizing or sterilising solid or liquid food products subjects the previously packaged products to heat treatment using microwaves in a pressurized chamber, in order to guarantee its conservation for long periods of time. At least three phases of operation include a rapid heating phase of the products, up to a temperature which is slightly lower than the pasteurizing or sterilising temperature; and a temperature equalising phase, and a cooling phase. The pressure inside the pressurised chamber, during the phases varies as a function of the temperature reached by the products. The plant includes a number of tubular elements (2, 3, 4; 11, 12, 13, 14), each of which consists of a number of sections (2a, 3a, 4a; 11a, 12a, 13a, 14a) cylindrical in shape and of a small diameter, each tubular element having devices for inserting and removing from it the products to be treated and for varying the ambient pressure inside it, as function of the temperature reached by the products.

30 Claims, 16 Drawing Sheets

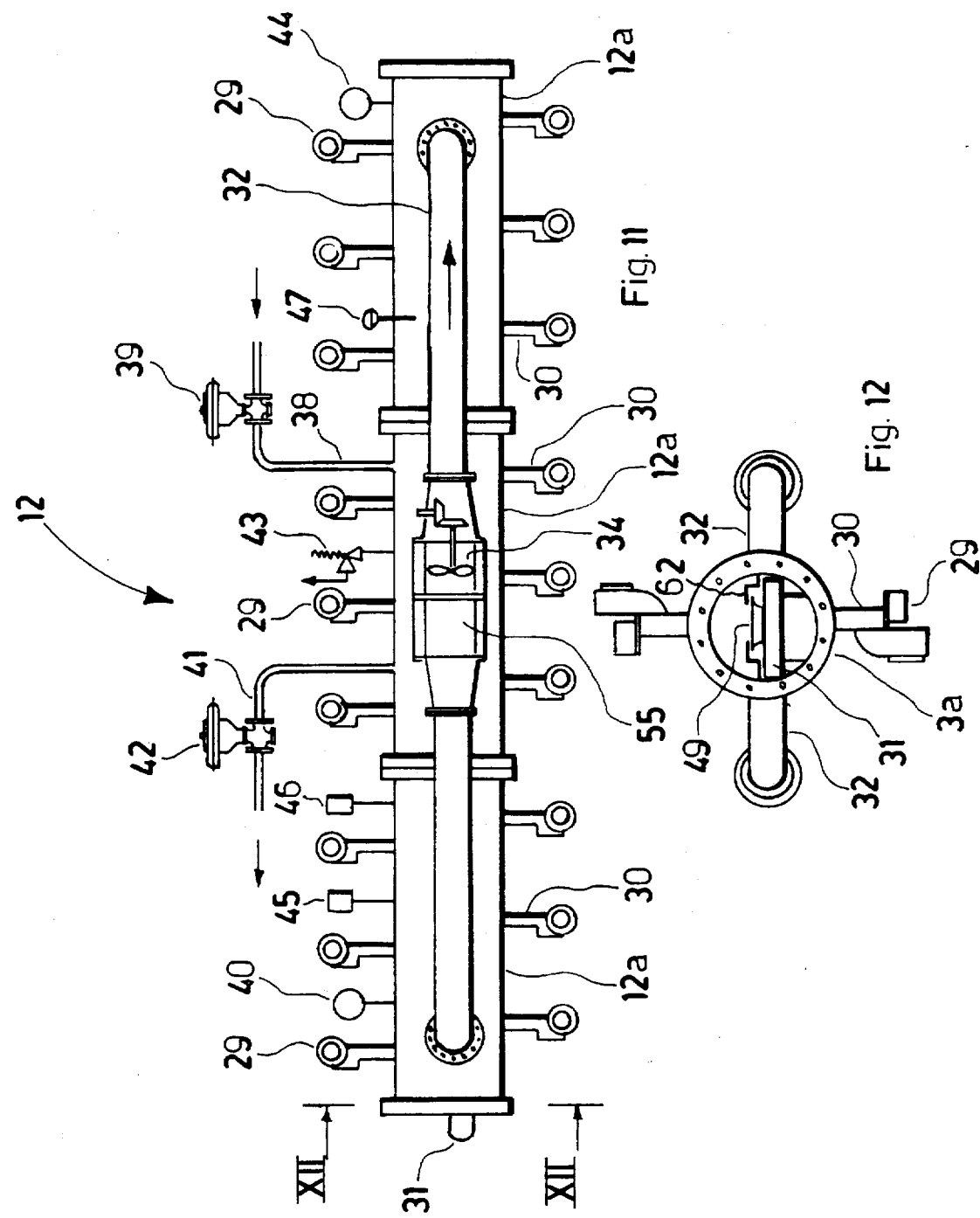

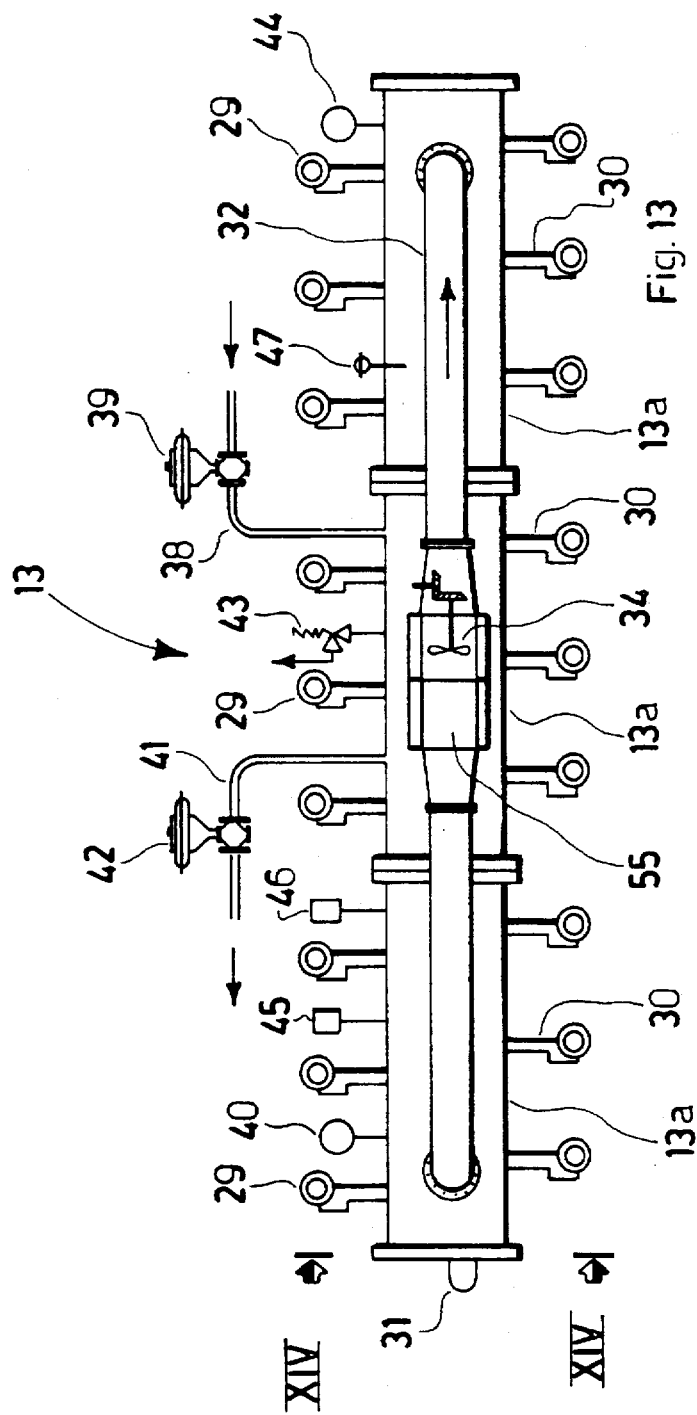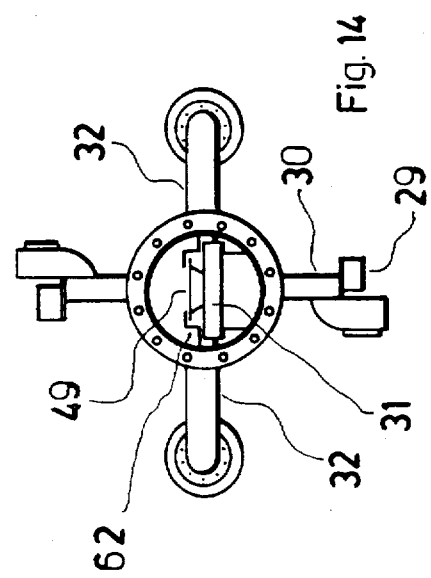

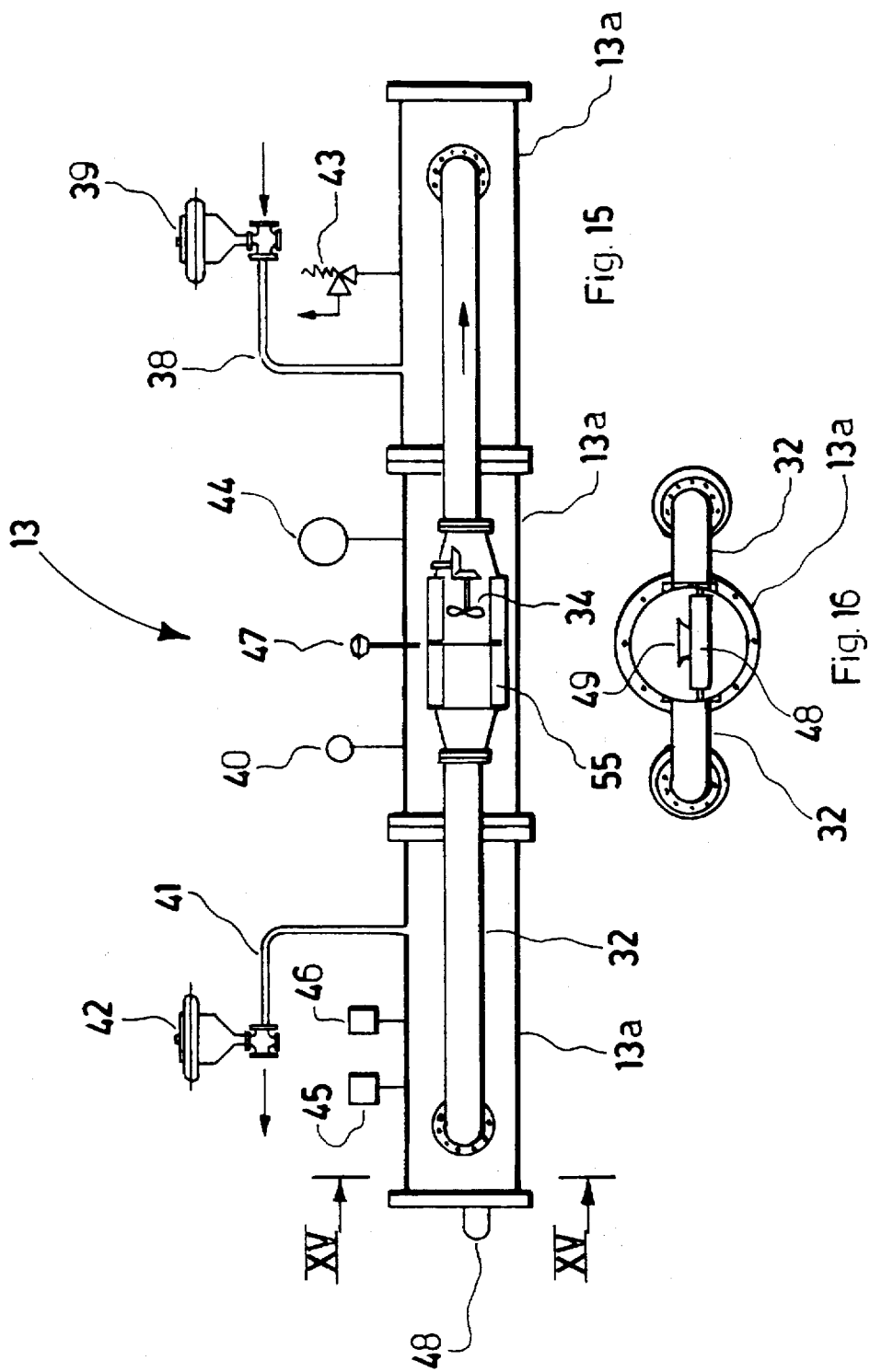

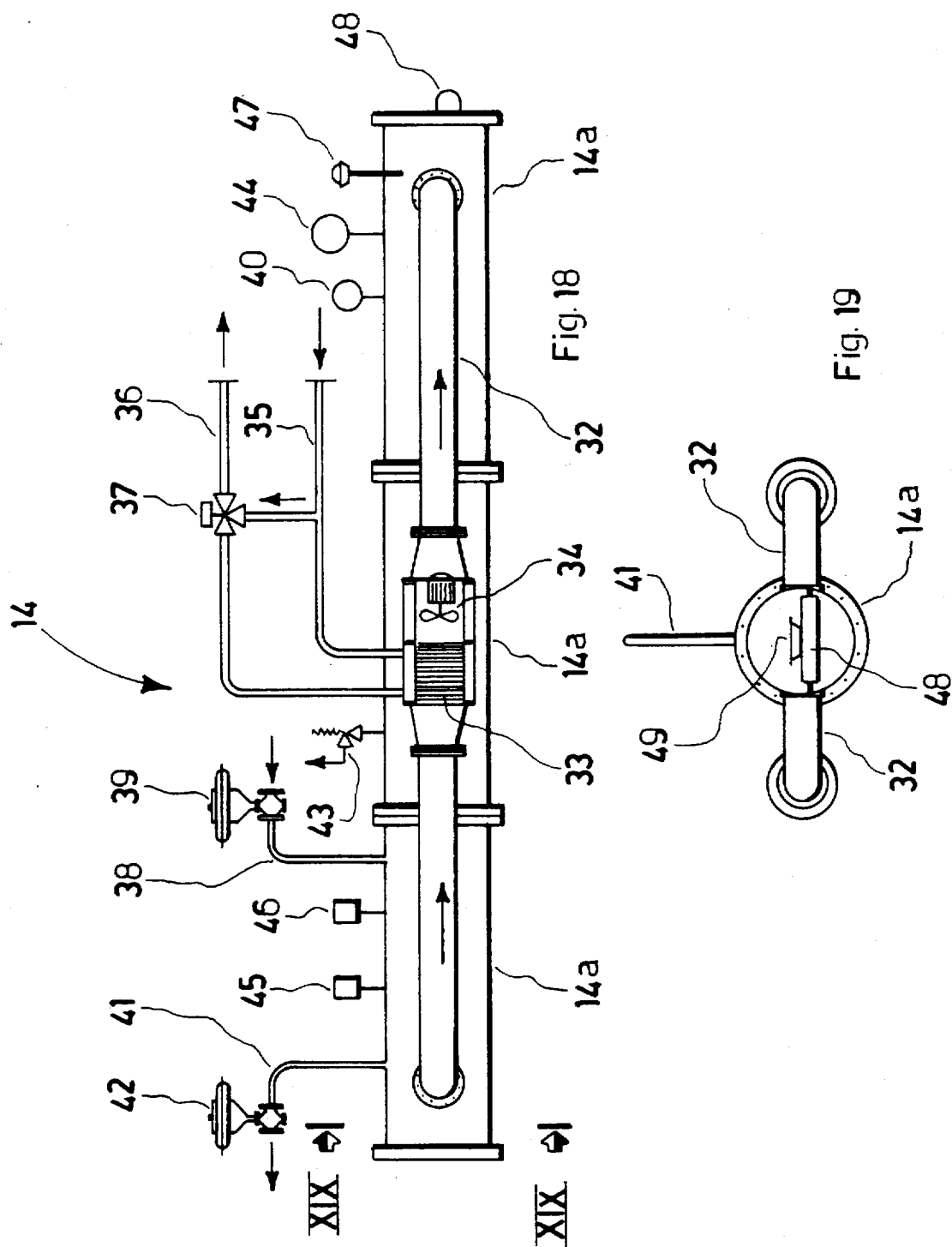

PLANT FOR PASTEURIZING OR STERILISING SOLID OR LIQUID FOOD PRODUCTS USING MICROWAVES

This is a continuation application Ser. No. 08/353,174, filed on Dec. 8, 1994, now abandoned.

FIELD OF THE INVENTION

The invention concerns a plant for pasteurizing or sterilising solid or liquid food products using microwaves, and subjecting a foodstuff, previously packaged, to heat treatment using microwaves to destroy the bacteria contained in it, in order to guarantee its conservation for long periods of time.

BACKGROUND OF THE INVENTION

The prior art involves the Italian patent for industrial invention No. 1224377 by the same applicant concerning a method and an oven for the sterilisation of foodstuffs by means of microwaves: the method consists of introducing into and steadily advancing the solid or liquid product to be treated, contained in a wrapping completely transparent to microwaves, in a chamber pressurised at about 2.5 bar, made multiresonant by the diffusion in it of high frequency microwaves, subjecting the product to a phase of rapid heating by means of microwaves, followed by a temperature-equalizing phase by means of microwaves and hot air, a temperature maintenance phase by means of hot air and a cooling phase by means of cold air, with the final extraction of the product from the pressurised chamber.

The oven consists of a cylindrical casing, the inside of which is subdivided longitudinally into two separate, superimposed parts, the phases of rapid heating and temperature equalization taking place in the upper part, while the cooling of the treated products takes place in the lower part. The advancement of the packages of products inside the oven takes place on frames operated by pairs of push rods, while the transfer of the frames with the products from the upper part to the lower part of the oven is effected by means of a lowering device, situated in a vertical end-chamber which connects the two parts of the oven and in which the temperature reached by the products at the end of the equalizing phase is maintained substantially constant. There are pressure compensation chambers at the entrance and exit of the oven, equipped with sealed airtight doors.

The method and the oven according to the prior art, although carrying out satisfactorily the pasteurization or sterilisation of the foodstuffs, have the drawback that the pressure inside the chamber in which the pasteurizing or sterilising treatment takes place is constant and always equal to the maximum value required; this means that, in the compensation chambers at the entrance and exit of the oven, the packages containing the products must be subjected to a very rapid variation in pressure, in order to introduce them into and extract them from the oven, with the risk of damaging or breaking the packages and, in the case of solid products, squashing the product during its introduction into the oven, because of the pressure difference between the outside and the inside of the package.

Furthermore, in the case of solid or semisolid products, during the rapid heating phase the product may overheat, particularly on its external surface, with consequent damage to its organoleptic qualities.

Furthermore, the presence of the compensation chambers means the oven can only work intermittently, since the products have to stay in the two chambers for the time required to obtain the required variation in pressure, limiting, therefore, its productivity. Finally, the transverse dimensions of the oven are considerable, requiring considerable thickness in the external walls, with consequently high construction costs and difficulty in obtaining uniform distribution of the microwaves in the treatment area; also, due to the said considerable size, there are large quantities of product in the oven during treatment, with the risk of large quantities of waste should there be a breakdown.

SUMMARY OF THE INVENTION

The present invention sets out to resolve the said technical problems by pasteurizing or sterilising food products with microwaves in a pressurised chamber, in which the pressure is varied according to the temperature reached by the products.

In the case of solid or semisolid products the first heating phase takes place in a refrigerated chamber, maintaining a substantially constant temperature.

The plant comprises a series of tubular elements, consisting of a small-diameter, cylindrical casing, joined together by connecting sections with airtight doors, the products being introduced into or extracted from these elements by means of conveyor devices, for example, belt or chain conveyors. The plant may consist of a plurality of sections functioning in parallel, inside each of which the complete treatment of the products to be pasteurized or sterilised takes place.

The advantages offered by the invention are: the elimination of the risk of damaging the containers of the products and the of squashing the products inside the said containers; the elimination of the risk of overheating the surface of the products, in the case of solid or semisolid products, thereby considerably improving the organoleptic qualities of the products treated; considerable simplification in the construction of the plant and considerable reduction of relative costs; the possibility of being able to construct a continuous-cycle plant, thereby considerably increasing productivity; the possibility of varying the treatment time of the products in function of the number of sections of plant operating in parallel; lower energy consumption as the products are supported on microwave-transparent elements; the possibility of varying the treatment times of the single phases independently, without varying the total duration of the treatment; treatment time independent of reductions or interruptions in the supply of products to be treated; the possibility of spreading production over a number of sections operating in parallel, with considerable reduction of waste in cases of breakdown; reduced linear dimensions for each section of the plant and, therefore, reduced thermal expansion.

BRIEF DESCRIPTION OF THE DRAWINGS

Some embodiments of the invention are illustrated, by way of example, in the sixteen sheets of drawings attached, in which:

FIG. 11 is a lateral view of a second version of the second tubular element of the plant in FIG. 2 in which the second phase of the pasteurization or sterilisation treatment of solid, soft or semiliquid foodstuffs is carried out;

FIG. 12 is section XII—XII of FIG. 11;

FIG. 13 is a longitudinal section of a third tubular element of the plant in FIG. 2, in which a third phase of the sterilising or pasteurizing procedure of solid, semiliquid or soft foodstuffs is carried out;

FIG. 14 is section XIV—XIV of FIG. 13;

FIG. 15 is a longitudinal section of a second version of the third tubular element of the plant in FIG. 2; FIG. 16 is section XVI—XVI of FIG. 15;

FIG. 18 is a section as in FIG. 17, relative to a second version of the fourth tubular element of the plant in FIG. 2 or of the third tubular element of the plant in FIG. 1;

FIG. 19 is section XIX—XIX of FIG. 18;

DESCRIPTION OF THE PREFERRED EMBODIMENT

Figure 1:
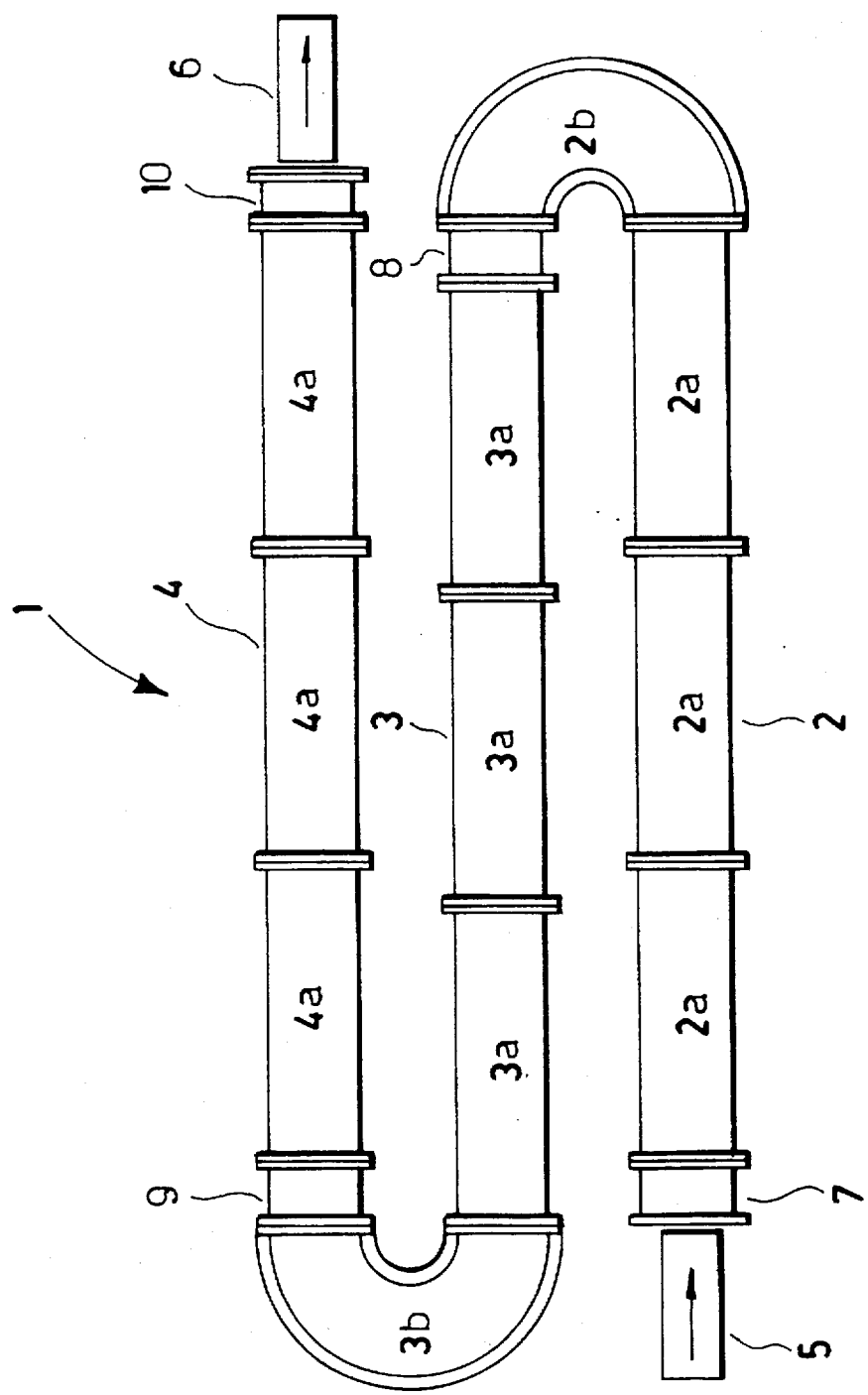
FIG. 1 is a schematic, plan view of a plant according to the invention for the sterilisation or pasteurization, in three phases, of liquid substances.

FIG. 1 shows, schematically, a plant 1 according to the invention for pasteurizing or sterilising substances in a liquid state in a discontinuous cycle. ÿ The plant includes a first tubular element 2 for the rapid heating of the product, made up of a plurality of small-diameter, cylindrical tubular sections 2a, substantially the same as each other and of an end tubular section 2b, with curved axis and angular development up to 180° and of a diameter substantially equal to that of the cylindrical tubular sections 2a, the said end section 2b connecting the said first tubular element 2 and a second tubular element 3 in which the phase of the maintenance of the final pasteurization or sterilisation temperature is carried out.

The second tubular element 3, similarly to the tubular element 2, is also made up of a plurality of small-diameter, cylindrical tubular sections 3a, which are substantially the same as each other, and of a end section 3b, tubular with curved axis and angular development up to 180°, which connects the second tubular element 3 to a third tubular element 4 in which cooling of the product after the pasteurization or sterilisation treatment is carried out.

The third tubular element 4 is made up of a plurality of smalldiameter cylindrical tubular sections 4a, substantially the same as each other.

The products to be sterilised or pasteurized, packaged in sealed containers 49 (FIG. 9) of materials transparent to microwaves, are inserted in the plant 1 and removed from it by means of a first conveyor device 5 and a second conveyor device 6, for example a conveyor belt.

The first conveyor device 5 inserts the containers 49 in an entrance element 7, which on the inside has opening and airtight closing devices (not shown), which is communicating with the first cylindrical, tubular section 2a of the first tubular element 2.

The second conveyor device 6 collects the containers 49 from an exit element 10, which on the inside has opening and airtight closing devices (not shown), which is communicating with the last cylindrical, tubular section 4a of the third tubular element 4.

A first connecting element 8 is inserted between the end section 2b of the first tubular element 2 and the second tubular element 3 of plant 1, a second connecting element 9 is inserted between the end section 3b of the second tubular element 3 and the third tubular element 4 of plant 1.

The elements 8 and 9, which are analogous to the entrance element 7 and to the exit element 10, are both have opening and airtight closing devices.

It should be noted that the curved tubular sections 2b, 3b may be omitted, if the space available for the installation of the plant 1 enables the tubular elements 2, 3 and 4 to be positioned in line.

Figure 2:
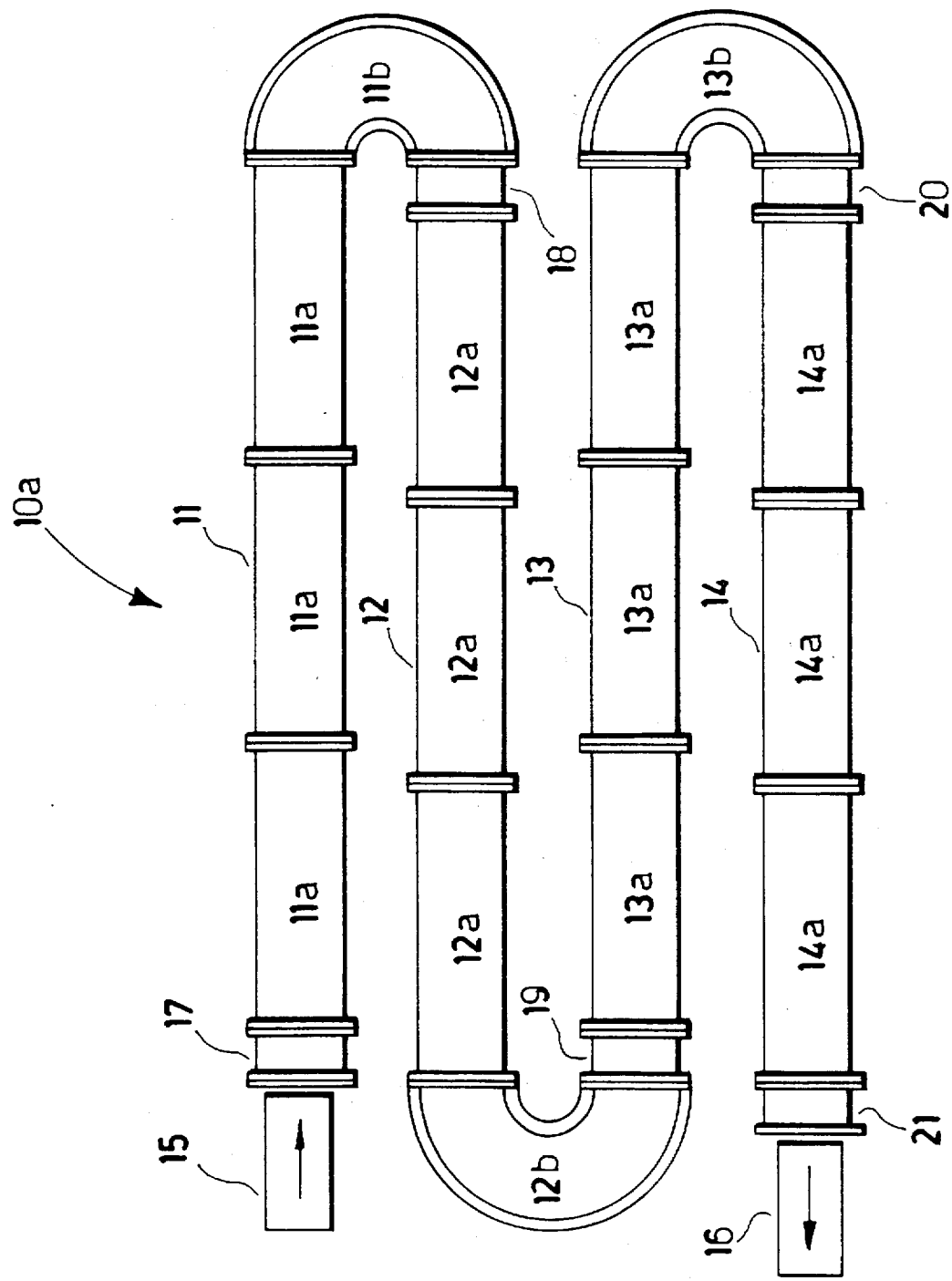
FIG. 2 is a view as in FIG. 1, relative, however, to a plant for the sterilisation or pasteurization, in four phases, of solid substances.

FIG. 2 shows, schematically, a plant 10a for pasteurizing or sterilising solid, soft or semiliquid products in a discontinuous cycle, consisting of four tubular elements.

The plant of FIG. 2 consists of a first tubular element 11 for the rapid heating of the product, made up of a plurality of smalldiameter, cylindrical, tubular sections 11a, substantially of the same as each other and a tubular end section 11b with a curved axis and angular development up to 180°, which connects said first tubular element 11 and a second tubular element 12, in which the final heating phase and the equalisation of the final treatment temperature of the product is carried out.

The said second tubular element is also composed of a plurality of small-diameter cylindrical, tubular sections 12a, substantially the same as each other, and of one tubular end section 12b with curved axis and angular development up to 180° and a third tubular element 13, for the maintenance of the final treatment temperature.

The said tubular element 13 is also composed of a plurality of small-diameter, cylindrical tubular sections 13a, substantially the same as each other and of a tubular end section 13b with curved axis and angular development up to 180°, which connects said third tubular element to a fourth tubular element 14 in which the cooling of the product takes place after it has been treated.

Said fourth tubular element 14 is composed of a plurality of small-diameter, cylindrical tubular elements, substantially the same as each other.

The products to be sterilised or pasteurized, packaged in sealed containers 49 of material transparent to microwaves, are inserted in the plant 10a and removed from it by means of a first conveyor device 15 and a second conveyor device 16, for example a conveyor belt.

The first conveyor device 15 inserts the containers 49 in an entrance element 17, which on the inside has opening and airtight closing device (not shown), which is communicating with the first cylindrical, tubular section 11 a and the first tubular element 11.

The second conveyor device 16 collects the containers 49 from an exiting element 21, which on the inside has opening and airtight closing device (not shown), which is communicating with the last cylindrical tubular section 14a of the fourth tubular element 14.

A first connecting element 18 is inserted between the end section 11b of the first tubular element 11 and the second tubular element 12 of the plant 10a, a second connecting element 19 is inserted between the end section 12b of the second tubular element 12 and the third tubular element 13 of the plant 10a and a third connecting element 20 is inserted between the end section 13b of the third tubular element 13 and the fourth tubular element 14 of the plant 10a.

The connecting elements 18, 19 and 20, which are analogous to the entrance element 17 and to the exit element 20, all have opening and airtight closing devices.

It must be noted that the curved tubular sections 11b, 12b, 13b may be omitted if the space available for the installation of the plant 10a allows the tubular elements to be positioned in line.

Figure 3:
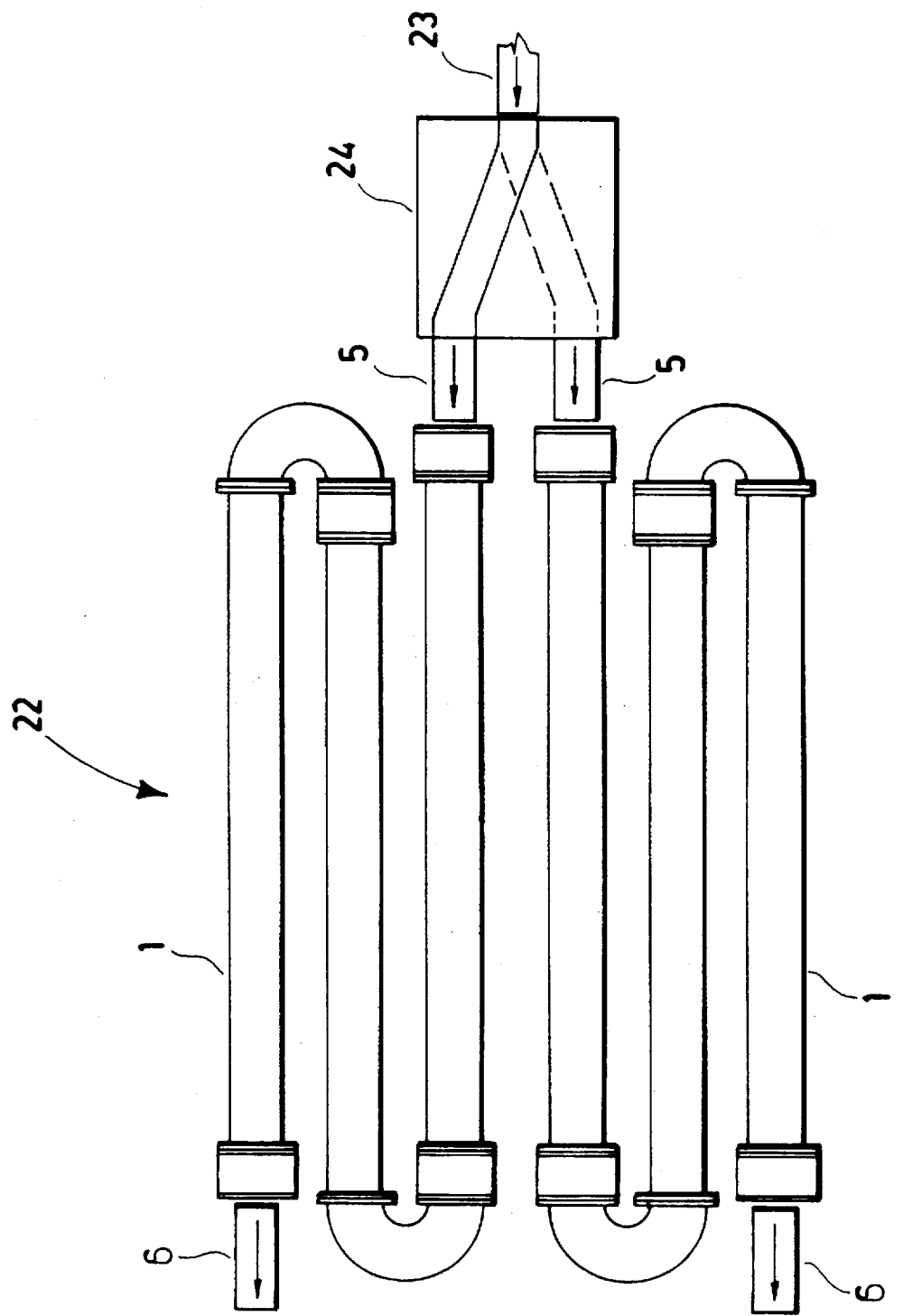
FIG. 3 is a schematic, plan view of two plants as in FIG. 1, joined in parallel to obtain a continuous operation cycle.

FIG. 3 shows a plant 22 for the treatment of substances in a liquid state in a continuous cycle, consisting of two or more plants 1, side-by-side or superimposed, fed in parallel by a conveyor belt 23, by means of a switching device 24.

Figure 4:
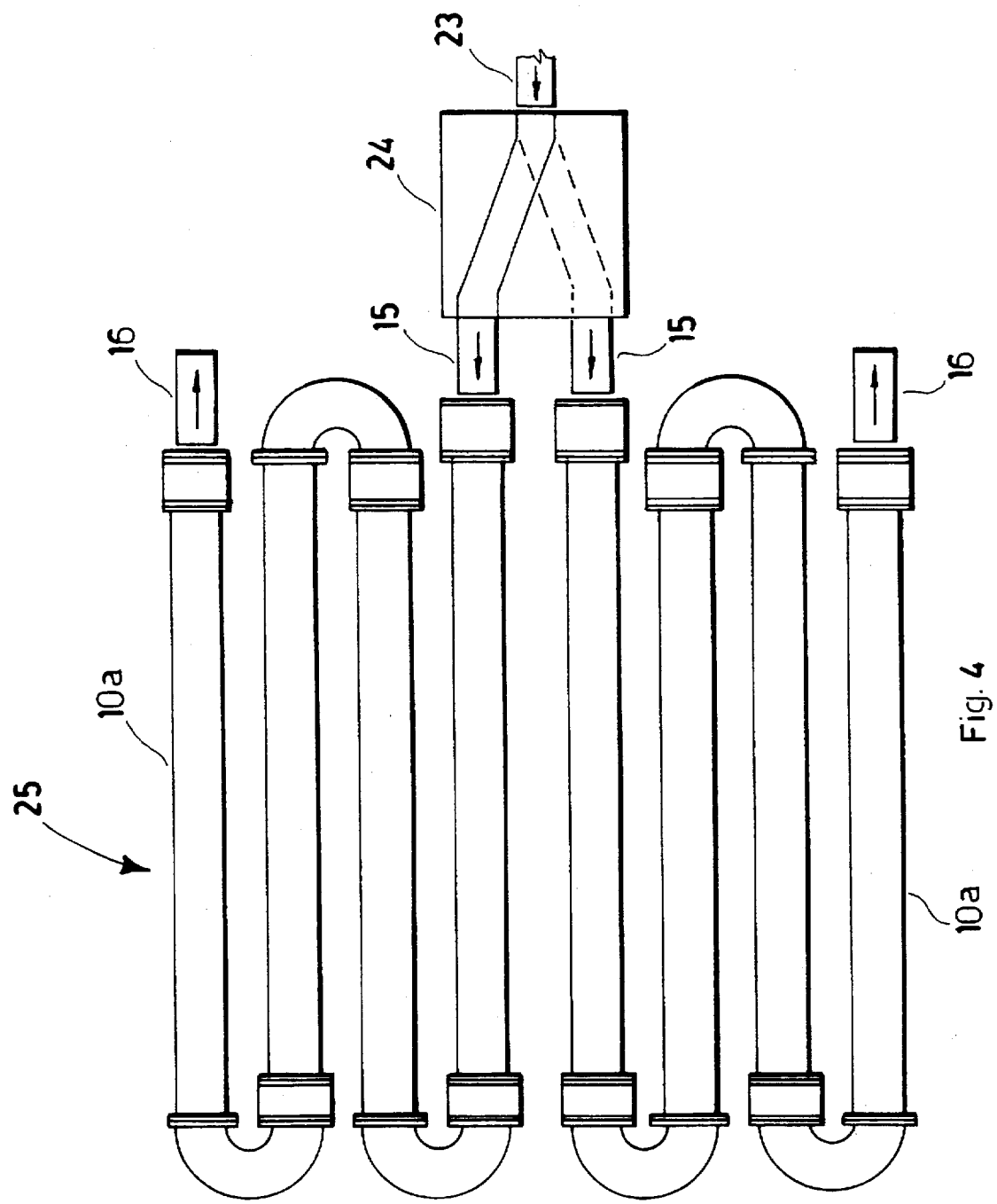
FIG. 4 is a schematic plan view as in FIG. 2, joined in parallel to obtain a continuous operation cycle.

FIG. 4 shows a plant 25 for the treatment of solid, soft or semiliquid substances in a continuous cycle, consisting of two or more plants 10a, side-by-side or superimposed, fed by a conveyor belt 23, by means of a switching device 24.

Figures 5, 6:
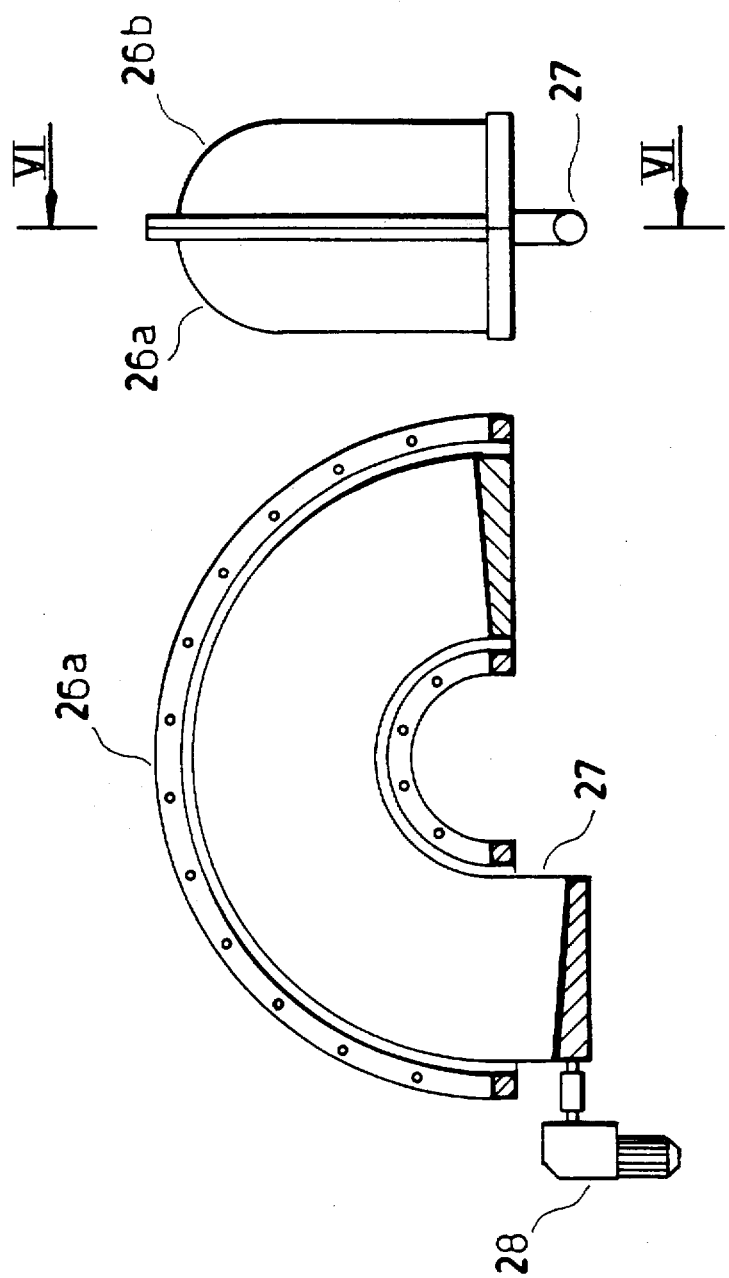
FIG. 5 is a lateral view of one of the connecting elements placed between the various tubular elements of the plant as in FIG. 1 or FIG. 2.
FIG. 6 is the section VI—VI of FIG. 5.

FIGS. 5 and 6 show one of the end sections 2b, 3b; 11b, 12b, 13b which connects the tubular elements 2, 3, 4; 11, 12, 13, 14 of plants 1 or 10a. Each one of the said end sections consists of two flanged halves 26a, 26b, inside which is placed a conveyor device 27, for example a conveyor belt, driven by a motor reducer 28, for transporting containers 49 with the product to be pasteurized or sterilised.

Figure 7:
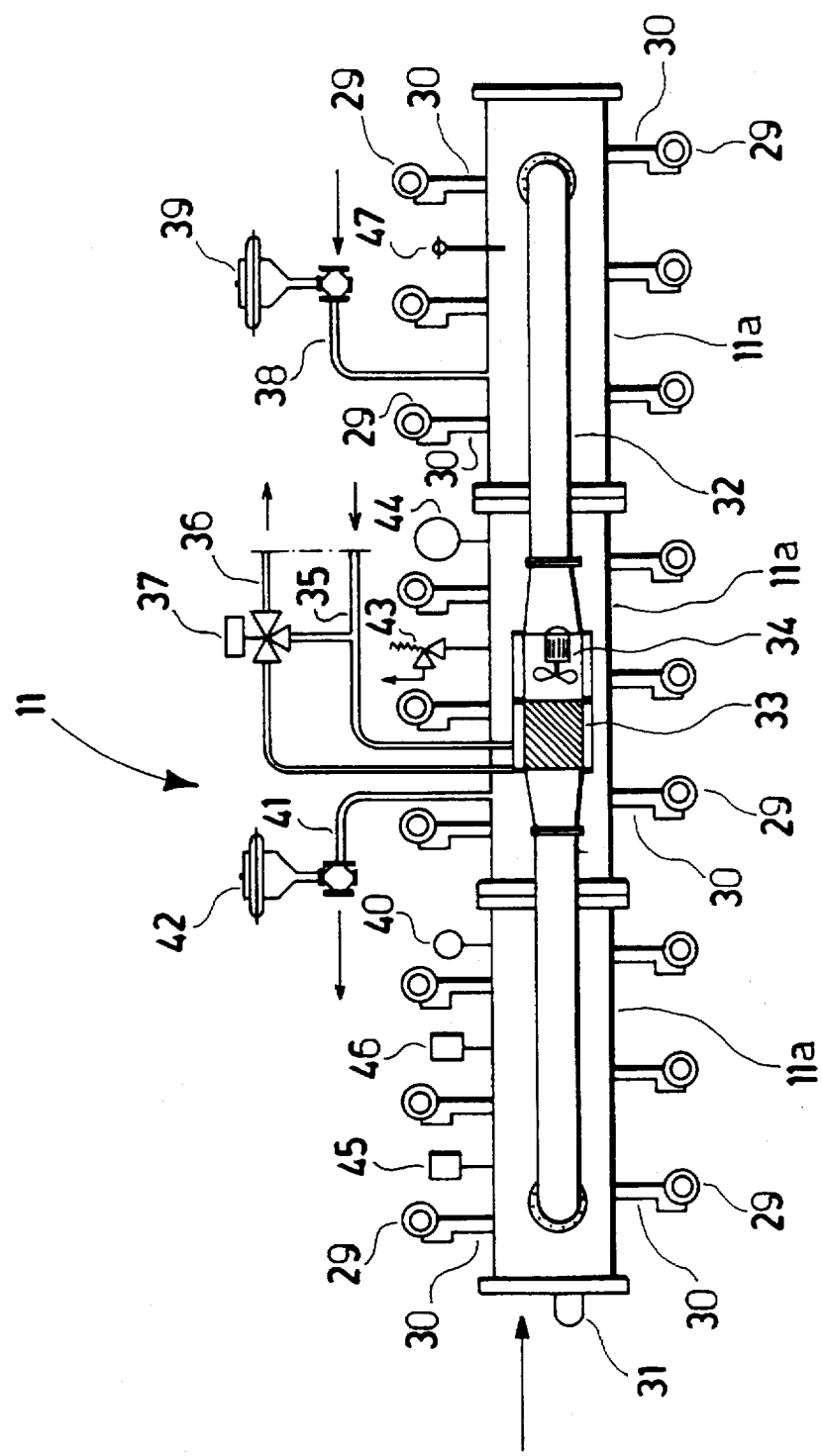
FIG. 7 is a lateral view of a first tubular element of the plant as in FIG. 2, in which the first phase of the sterilisation or pasteurization procedure of solid, semiliquid or soft foodstuffs is carried out.
Figure 8:
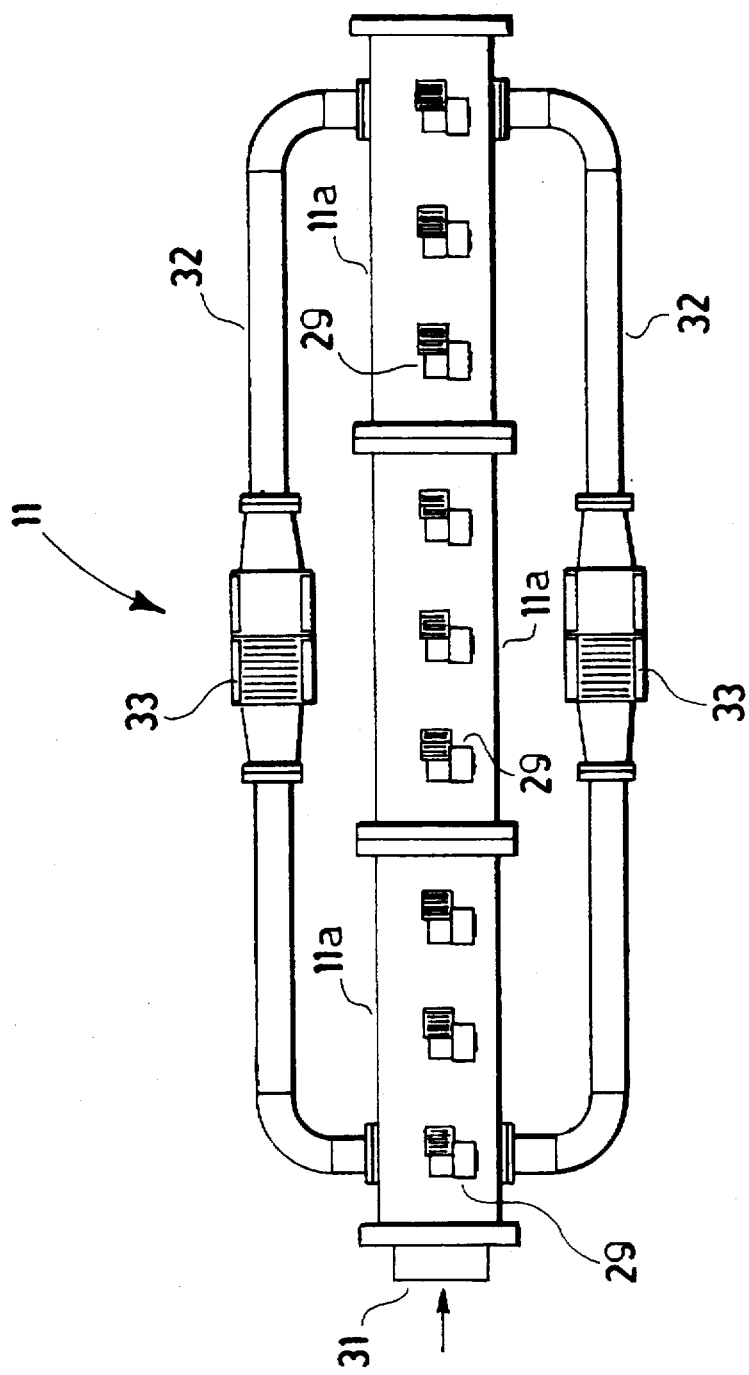
FIG. 8 is a plan view of the first tubular element of the plant as in FIG. 7.

FIG. 7 shows a first tubular element 11 of the plant 10a for pasteurizing or sterilising solid, soft or semiliquid products, in which the first phase of the of the pasteurization or sterilisation treatment is carried out, consisting of the rapid heating of the products, at progressively increasing pressure in function of the temperature.

Along the said first tubular element 11, a number of microwave generators 29, for example magnetron, are arranged in staggered longitudinal or circumferential rows, having wave guides 30 that, preferably, have a rectangular section.

If rectangular section wave guides 30 are used, the wave guides of the microwave generators 29 of the same row are preferably alternatively rotated 90° with respect to each other. The containers 49 containing the products to be pasteurized or sterilised are conveyed through the said first tubular element 11 by means of a conveyor device 31, for example a conveyor belt, made in microwave transparent material to allow the products to be radiated from below, through the base of the containers 49. The tubular element 11 also has a pair of air cooling ducts 32, which communicate with the inside of the tubular sections 11a, each duct 32 having a heat exchanger 33 and a fan 34.

The exchanger 33 is supplied with a primary refrigerating fluid, for example, glycol, by means of a supply tube 35 and a discharge tube 36.

The flow of the refrigerating fluid in the exchanger is controlled by means of a three-way valve 37.

The inside of the tubular element 11 is pressurised, with progressively increasing pressure, in function of the temperature reached by the product, by means of compressed air introduced through a tube 38 with a valve 39, preferably pneumatically operated, to modulate the pressure inside the said tubular element 11.

The valve 39 is linked to a pressure transducer 40, through a PLC (not shown).

To discharge the pressurised air from the tubular element 11 there is a discharge tube 41 with a discharge valve 42, for example pneumatically operated, which permits the slow or rapid decompression of the tubular element 11.

The tubular element 11 also has a pressure limiting safety valve 43, a pressure gauge 44 to check the pressure, two safety manostats 45 and 46, respectively for minimum and maximum pressure, which control, through the PLC, the discharge valve 42, and a temperature sensor 47 which is linked to the valve 37 through the PLC.

Figure 9:
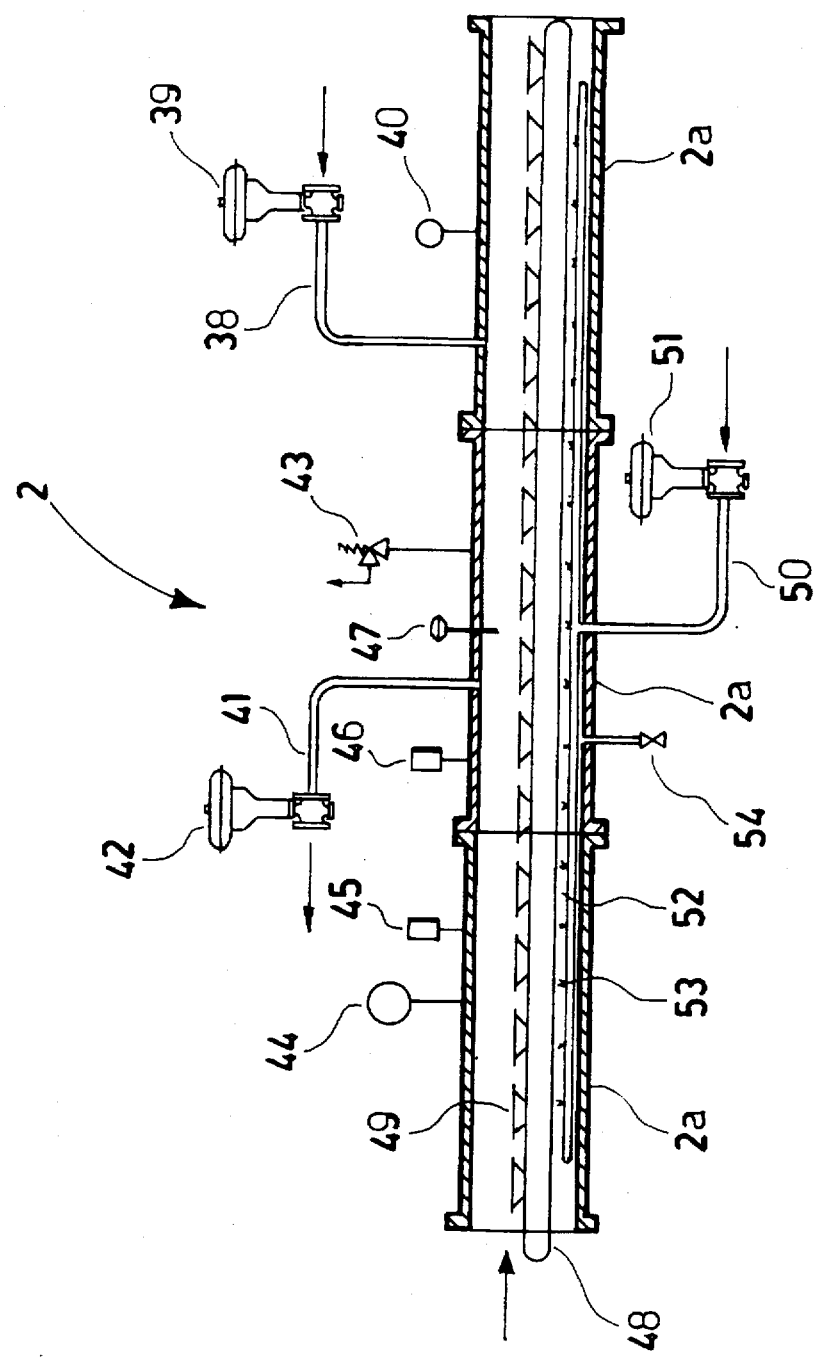
FIG. 9 is a longitudinal section of a first tubular element of the plant of FIG. 1, in which the first phases of the sterilisation or pasteurization procedure of liquid foodstuffs is carried out.

FIG. 9 shows a first tubular element 2 of the plant of FIG. 1 for the sterilisation of liquid products in which a first phase of rapid heating of the product is carried out by means of pressurised water vapour, which is introduced into said first tubular element 2 by means of an inlet pipe 50 with a valve 51, for example pneumatically operated, to control the flow of the vapour, said valve 51 being linked through the PLC to a temperature sensor 47. The vapour introduced through the inlet pipe 50 is distributed inside the tubular element 2 by means of a tube 52 that has nebulizer nozzles 53.

Any condensation which forms inside the tubular element 2 is discharged outside through the discharge valve 54.

The containers 49 containing the products to be pasteurized or sterilised are conveyed through said first tubular element 2 by means of a conveyor device 48, for example a conveyor belt.

The inside of the tubular element 2 is pressurised, with progressively increasing pressure, in function of the temperature reached by the product, by means of compressed air supplied through a tube 38 with a valve 39, preferably pneumatically operated, to vary the pressure inside said tubular element 2.

The valve 39 is linked to a pressure transducer 40, through a PLC (not shown).

To discharge the pressurised air from the tubular element 2, there is a discharge pipe 41 equipped with a discharge valve 42, for example pneumatically operated, which enables the slow or rapid decompression of the tubular element 2.

Further, the tubular element 2 has a pressure limiting safety valve 43 a pressure gauge 44 to check the pressure, two safety manostats 45 and 46, respectively for minimum and maximum pressure, which control the discharge valve 42 through the PLC, and a temperature sensor 47.

Figure 10:
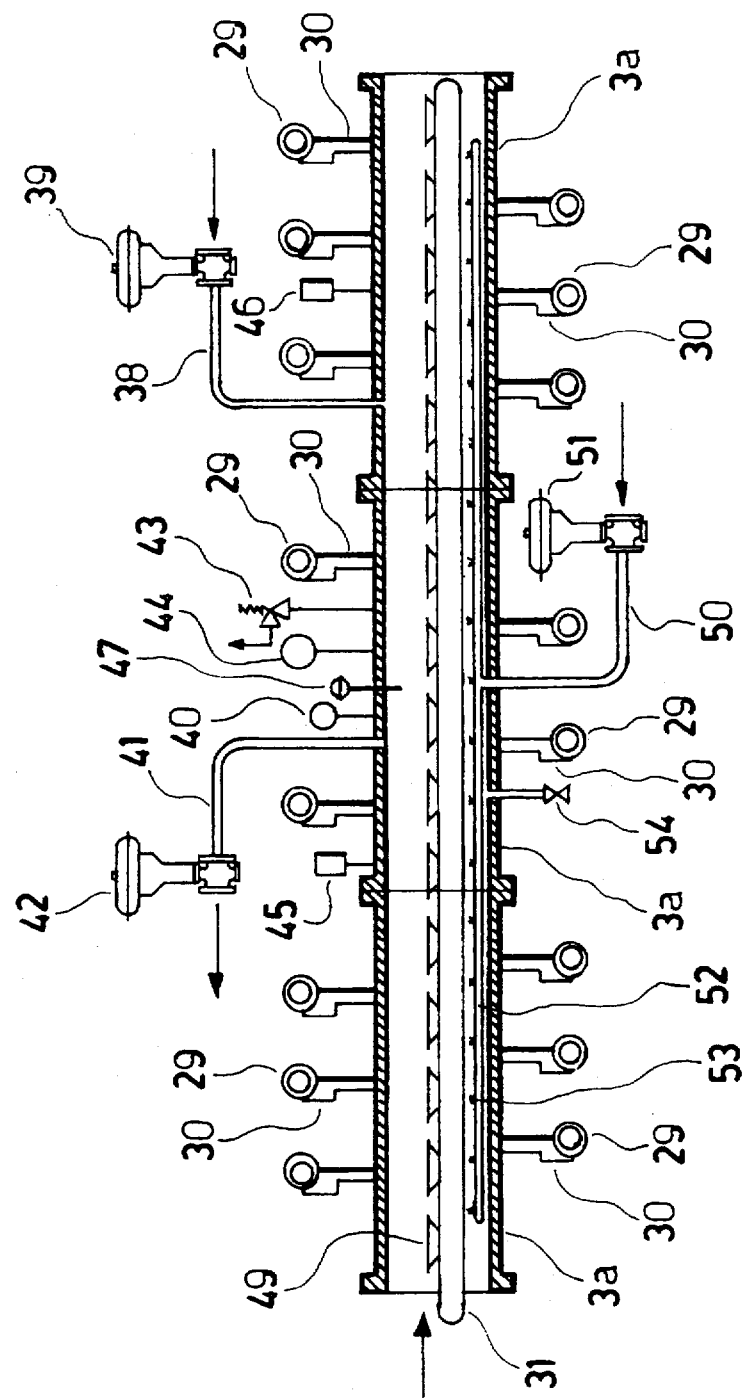
FIG. 10 is a longitudinal section of a first version of a second element of the plant of FIG. 2, in which the second phase of the sterilisation or pasteurization procedure of solid, soft or semiliquid foodstuffs takes place, the said second tubular element may also be used to carry out the second phase of the pasteurization or sterilisation of liquid foodstuffs in the plant in FIG. 1.

FIG. 10 shows a second tubular element 3 of the plant 1 for pasteurizing or sterilising liquid products or a first version of the second tubular element 12 of the plant 10a for pasteurizing or sterilising solid, semiliquid or soft products. In the said second tubular element 3, 12, both in the case of liquid products and in the case of solid, semiliquid or soft products, the second phase of the pasteurization or sterilisation treatment is carried out, consisting of the equalisation of the temperature reached by the products at the end of the first rapid heating phase, in the case of solid, semiliquid or soft products, and of the maintenance of the pasteurization or sterilisation temperature phase, in the case of liquid products.

Along the said second tubular element 3, 12 a number of microwave generators 29, for example magnetron, are arranged in staggered longitudinal or circumferential rows, having wave guides 30 that, preferably, have a rectangular section.

If rectangular section wave guides 30 are used, the wave guides of the microwave generators 29 of the same row are preferably alternatively rotated 90° with respect to each other.

The containers 49 containing the products to be pasteurized or sterilised are conveyed through the said second tubular element 3, 12 by means of a conveyor device 31, for example a conveyor belt, made in microwave transparent material to allow the products to be radiated from below, through the base of the containers 49.

The inside of the tubular element 3, 12 is pressurised, with progressively increasing pressure, in function of the temperature reached by the product, by means of compressed air introduced through a tube 38 with a valve 39, preferably pneumatically operated, to modulate the pressure inside the said tubular element 3, 12.

The valve 39 is linked to a pressure transducer 40, through a PLC (not shown).

To discharge the pressurised air from the tubular element 3, 12 there is a discharge tube 41 with a discharge valve 42, for example pneumatically operated, which permits a slow or rapid decompression of the tubular element 3, 12.

The tubular element 11 also has a pressure limiting safety valve 43, a pressure gauge 44 to check the pressure, two safety manostats 45 and 46, respectively for minimum and maximum pressure, which control the discharge valve 42 through the PLC, and a temperature sensor 47.

The equalisation of the temperature in the throughout the entire mass of products subjected to the pasteurization or sterilisation treatment is achieved by means of pressurised water vapour which is introduced into the said second tubular element 3, 12 through inlet pipe 50 with a valve 51, for example pneumatically operated, to control the flow of the vapour, said valve 51 being linked through the PLC to a temperature sensor 47.

The vapour introduced through the inlet pipe 50 is distributed inside the tubular element 3, 12 by means of a tube 52 that has nebulizer nozzles 53.

Any condensation which forms inside the tubular element 3, 12 is discharged outside through the discharge valve 54.

FIGS. 11 and 12 show a second version of the second tubular element 12 of plant 10a for pasteurizing or sterilising solid, semiliquid or soft products.

The said second version of tubular element 12 differs from the first version shown in FIG. 10 in that the temperature equalisation throughout the entire mass of products subjected to the pasteurization or sterilisation treatment is achieved by means of pressurised hot air. To this end tubular element 12 has a pair of channels 32a that are communicating with the inside of tubular sections 12a, each channel 32a having fan 34 and electric radiator 55.

FIGS. 13 and 14 show a third tubular element 13 of plant 10a for pasteurizing or sterilising solid, semiliquid and soft products, inside which the third phase of the pasteurization or sterilisation procedure is carried out, consisting of maintaining the temperature of the products at the value reached at he end of the first two phases for a predetermined length of time.

The structure of the third tubular element is essentially identical to that of the second tubular element 12, the only difference being possibly in the number and power rating of the microwave generator elements 29, in that the thermal power required in the said third phase of the pasteurization or sterilisation procedure is lower than that required for the second phase.

FIGS. 15 and 16 show a second version of the said third tubular element 13 in which the temperature is maintained using only hot air.

The said second version of the said third tubular element differs from the first version, shown in FIGS. 13 and 14, in that it does not have any microwave generator elements.

Figure 17:
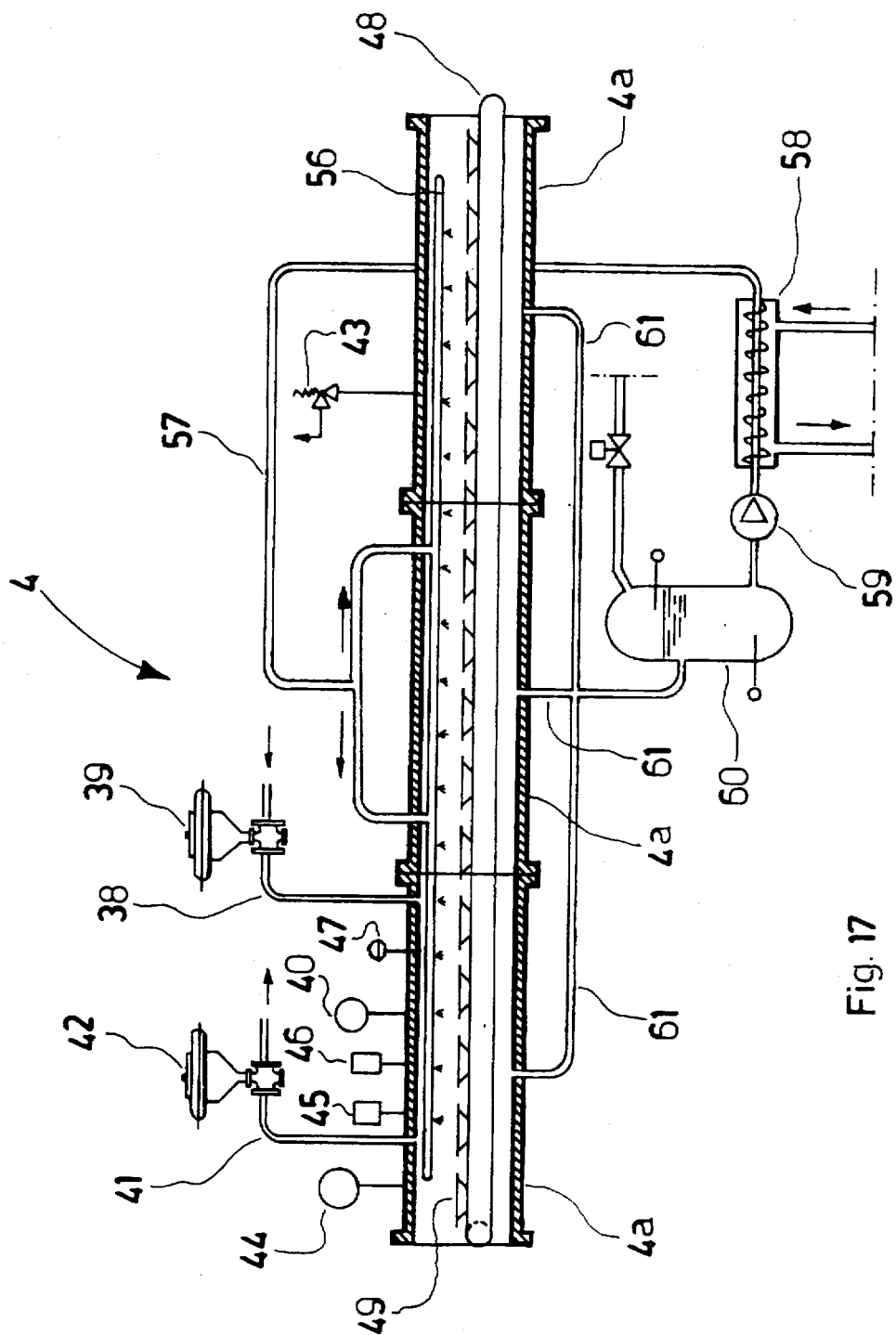
FIG. 17 is a longitudinal section of a fourth tubular element of the plant in FIG. 2, in which a fourth phase of the sterilisation or pasteurization procedure of solid, semisolid, or soft foodstuffs is carried out, or of a third tubular element of the plant in FIG. 1, in which a third phase of the sterilisation or pasteurization procedure for liquid foodstuffs is carried out.

FIG. 17 a third tubular element 4 of plant 2 for pasteurizing or sterilising liquid products, or a first version of a fourth tubular element 14 of plant 10a for pasteurizing or sterilising solid, semiliquid or soft products, in which the products are cooled at the end of the pasteurization or sterilisation procedure treatment.

The cooling is carried out using water which is sprinkled on containers 49 from a cooling water distribution tube 56, supplied by a pipe 57 originating at a refrigerating heat exchanger 58.

The refrigerator 58 is supplied by a feed pump 59 which takes the water to be cooled from a reservoir 60 which collects the cooling water used in tubular element 4, 14 by means of collection pipes 61.

FIGS. 18 and 19 show a second version of the fourth tubular element 14 of plant 10a in which the products are cooled by means of refrigerated air introduced into tubular element 14 through a pair of channels 32 each of which is has a heat exchanger 33 and fan 34.

The exchanger 33 is supplied with a primary refrigerating fluid, for example ethylene glycol, by means of a supply tube 35 and a discharge tube 36.

The flow of the refrigerating fluid in the exchanger is controlled by means of a three-way valve 37.

All the tubular elements of the plant 1 or of the plant 10a that have microwave generator elements have a screening element 62 to screen the sides of the packages 49 from the microwaves with a view to preventing the products contained in them from overheating in the areas adjacent to the said sides.

Figure 20:
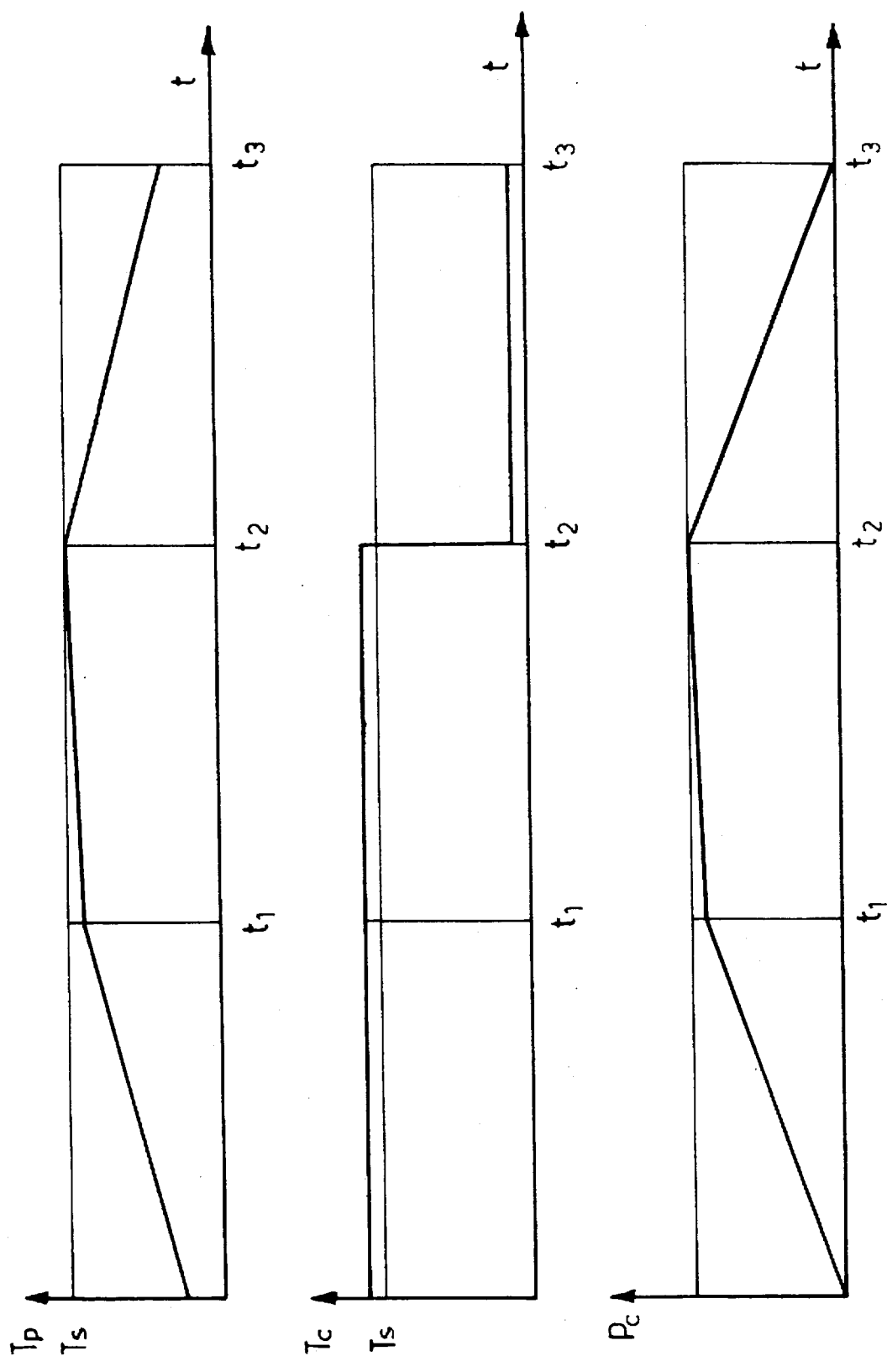
FIG. 20 is a diagram showing the variations in time of the pressure and temperature inside the plant and of the temperature of the product during the treatment phases of liquid products.

In FIG. 20 there are three diagrams that show the variation, in function of time, of the ambient pressure pc, the ambient temperature $T_c$ and the temperature of the product $T_p$ during the three phases of the pasteurization or sterilisation treatment of a liquid product.

The ambient pressure $P_c$ and the ambient temperature $T_c$ are the pressure and the temperature inside the tubular elements 2, 3 and 4 of plant 1. The times $t_1$, $t_2$, $t_3$ represent the duration of the various phases of the treatment; $T_s$ and $P_s$ are, respectively, the pasteurizing, or sterilising, temperature and pressure.

Figure 21:
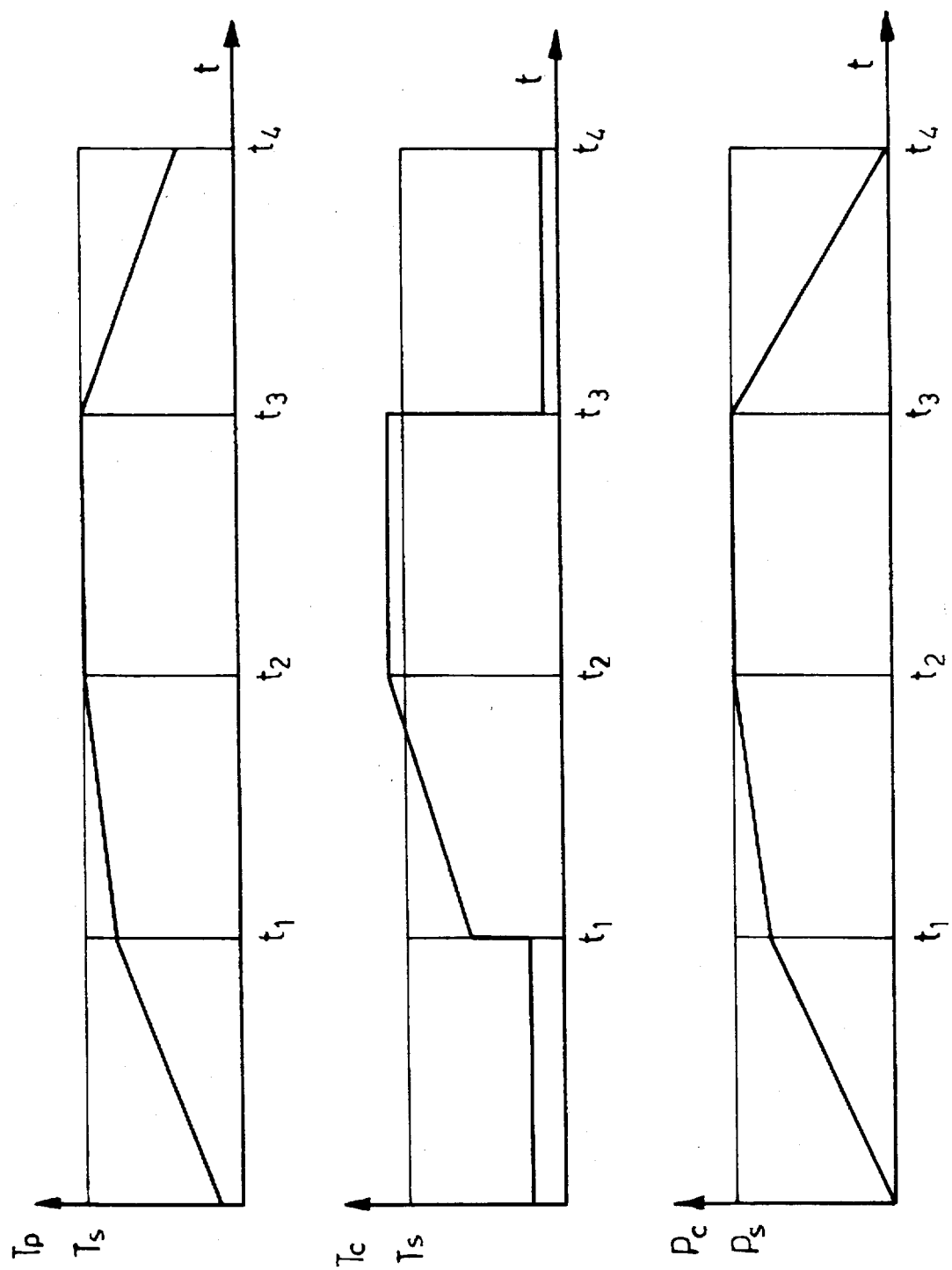
FIG. 21 is a diagram as in FIG. 20, relative, however, to the treatment phases of solid or semisolid products.

In FIG. 21 there are three diagrams, similar to those in FIG. 20, that show the variation, in function of time, of the ambient pressure $P_c$, the ambient temperature $T_c$ and the temperature of the product $T_p$ during the four phases of the pasteurization or sterilisation treatment of solid, semisolid products.

The ambient pressure pc and the ambient temperature $T_c$ are the pressure and the temperature inside the tubular elements 11, 12, 13 and 14 of plant 10a. The times $t_1$, $t_2$, $t_3$ represent the duration of the various phases of the treatment; $T_s$ and $p_s$ are, respectively, the pasteurizing, or sterilising, temperature and pressure.

In the Figures the analogous elements, that is, those that have the same function, are indicated with the same reference numbers.

Operation of the plant 10a for pasteurizing or sterilising solid, semiliquid or soft products, is as follows: the packages 49 containing the products to be subjected to the pasteurization or sterilisation treatment are inserted in the first tubular element 11 of the plant by conveyor device 15 through the entry element 17 and transported inside the said first tubular element by the conveyor device 31 until the sections 11a and 11b of tubular element are completely filled.

Once the loading of the tubular element 11 of the plant has been completed the first phase of the pasteurization or sterilisation treatment is started, consisting of the rapid heating of the product, activating magnetrons 29 and refrigerator 33, whilst the containers of the products are made to oscillate back and forth by the conveyor device 31. The refrigerator 33 maintains the ambient temperature inside the said first tubular element 11 at a value of between 5° C. to 15° C. depending on the type of product being treated: this so as to avoid overheating the product, with a nonuniform absorption of the microwaves, in particular on the outside surface of the product itself.

While the products inside the containers 49 are being heated up by the microwaves, the pressure inside the said first tubular element 11 of the plant is increased, with a substantially linear progression, by introducing compressed air into the tubular element through the control valve 39, for example pneumatically operated, in such a way that the pressure corresponds substantially, at every moment, to the vapour pressure of water at the temperature reached by the product.

At the same time, the second tubular element 12a of plant 11 is pressurised to a point where the pressure inside it corresponds to the vapour pressure of water at the temperature reached by the product at the end of the first phase.

At the same time, the electric radiator 55 is switched on, which, with fan 34 sends hot air inside the tubular element 12a until the temperature inside it reaches a value corresponding to that reached by the product at the end of the said first phase.

On conclusion of the heating up of the product in the said first phase of the treatment, the pressures inside the first tubular element 11 and the second tubular element 12 are balanced and the product can be passed through into the second tubular element 12, through connecting element 18 by means of conveyor devices 31 and 27 of the first tubular element 11 and the conveyor device 31 of the second tubular element 12.

On conclusion of the transfer of the product into the second tubular element 12, the magnetrons 29 of the said second tubular element are switched on, while, at the same time, the pressure inside the first tubular element 11 is reduced to atmospheric pressure discharging the pressurised air through valve 42, for example pneumatically operated.

In the second tubular element 12 the product is subjected to the second phase of the sterilisation or pasteurization constment consisting of a further heating using microwaves and pressurised water vapour, or hot air, at a slightly higher temperature, for example by 5° C., than sterilising or pasteurizing temperature, the vapour being introduced by means of nozzles 53 supplied by inlet tubing 50, through a flow control valve 52, for example pneumatically operated.

The heating of the product in the second phase of the treatment occurs with a lower temperature gradient than the temperature gradient in the first phase, the pressure inside the second tubular element 12 being gradually increased so that it corresponds substantially, at every moment, to the vapour pressure of water at the temperature reached by the product.

While the product is being subjected to the second phase of the pasteurizing or sterilising treatment in the second tubular element 12 of the plant, the first tubular element 11 is loaded with another series of containers and the first phase of the treatment of the product is started. At the same time the third tubular element 13 is prepared for receiving the product subjected to the second phase of the treatment bringing the pressure inside it, by introducing compressed air through control valve 39, to a value substantially the same as the pressure reached in the second tubular element 12 at the end of the second phase of the treatment; at the same time the temperature of the third tubular element 13 is also brought up to a value corresponding substantially to that reached by the product at the end of the second phase of the treatment, heating the air inside the said third tubular element 13 using electric radiator 55 and circulating it by means of fan 34 and channels 32.

At the end of the second treatment phase, the containers 49 are made to pass through into the third tubular element 13 of the plant, through connecting element 19, by means of conveyor devices 31 and 27 of the second tubular element 12 and conveyor device 31, or 48, of the third tubular element 13 of the plant.

In the third tubular element 13 of the plant (FIGS. 13–16) the third phase of the pasteurizing or sterilising treatment of the product is carried out, consisting of maintaining the pasteurizing or sterilising temperature for the time required to kill 100% of the microorganisms present in the product. The third phase of the treatment is carried out at a constant pressure and the maintenance of the pasteurizing or sterilising temperature can be achieved with microwaves and hot air (FIGS. 13, 14), with microwave radiation of considerably reduced power with respect to that used in the second phase, or only with hot air (FIGS. 15, 16).

While the third phase of the treatment is being carried out, the containers of the product previously introduced into the first tubular element 11 and subjected to the first phase of the pasteurization or sterilisation treatment are transferred to the second tubular element 12 where they are to be subjected to the second phase of the pasteurization or sterilisation treatment and the first tubular element 11 is loaded with another series of containers after the pressure inside it has been reduced to atmospheric pressure, so as to start the first phase of the treatment of the product.

At the same time, the fourth tubular element is pressurised to a value equal to that of the third tubular element 13 and heated to a temperature equal to that of the third tubular element 13 of the plant.

A the end of the third phase of the pasteurization or sterilisation treatment, the containers in the third tubular element 13 of the plant are transferred to the fourth tubular element 14 where they are subjected to the fourth and final phase of the treatment: the transfer is achieved with conveyor devices 27 and 31, or 48, of the third tubular element 13 and the conveyor device 48 of the fourth tubular element 14.

When the containers 49 have been transferred to the fourth tubular element 14, the containers in the second tubular element 12 are transferred to the third tubular element 13, the containers in the first tubular element 11 are transferred to the second tubular element 12 and the first tubular element 11 is filled with another series of containers in accordance with the procedures described previously.

The fourth phase of the pasteurization or sterilisation treatment consists of the progressive cooling of containers 49 and of the products contained in them with a simultaneous progressive reduction in the pressure inside the said fourth tubular element 14 of the plant down to ambient temperature and pressure.

The cooling is carried out with refrigerated water (FIG. 17), sprinkled on the containers 49 by a distribution pipe 56, or with refrigerated air (FIG. 18), the pressure inside the said fourth tubular element 14 being progressively reduced, discharging pressurised air through discharge tube 41 and discharge valve 42, for example pneumatically operated. The pressure is reduced in such a way that the value of the pressure corresponds, at every moment, to the vapour pressure of water at the temperature reached by the product.

After the cooling, the containers 49 extracted from the fourth tubular element 14 of the plant, through the exit element 17 by means of the exit conveyor device 16.

Subsequently, the pressure in the fourth tubular element 14 is restored to the value at the start of the cooling and the containers 49 in the first three tubular elements are transferred to the next tubular element and the first tubular element 11 is loaded with another series of containers.

Having a number of plants 10a in parallel, side-by-side or superimposed, and feeding them alternatively by means of conveyor device 23, for example a conveyor belt, having a switching device 24, to transfer the containers 49 onto the conveyor devices 15 feeding the various plants it is possible achieve operation in a continuous cycle, that is, without ever interrupting the flow of containers arriving from conveyor device 23.

The pasteurization or sterilisation treatment for liquid foodstuffs can only include three phases, that is, two heating phases of the product at different speeds and a cooling phase, as the pasteurization or sterilisation temperature equalisation phase is not required in that the convection currents set up within the liquid product during the heating phases brings about a satisfactory equalisation of the temperature throughout the mass of the product.

The heating and cooling phases of the pasteurization or sterilisation treatment of foodstuffs in the liquid state are carried out in an analogous way to that already described for solid products, apart from in the rapid heating phase, in which, for liquid products, the tubular element of the plant in which the said rapid heating takes place does not need to be refrigerated as there is no risk of the product overheating locally or on the surface due to the internal convective currents.

The heating can, thereby, be carried out in a plant 1 in which the product in the first tubular element 2 is heated by means of pressurised vapour (FIG. 9) fed into the tubular element itself through pipe 52 having nebulizer nozzles 53 supplied by tubing 50, through flow control valve 51, for example pneumatically operated.

The second heating phase can be carried out with microwaves and vapour, or microwaves and hot air, with the same procedure already described for the sterilisation or pasteurization of solid, soft or semiliquid products. The cooling phase is also carried in an analogous way to that already described for solid, soft or semiliquid products.

I claim:

1. A plant for treating food products within respective sealed packages comprising:

a plurality of processing elements being each separately operable under different temperature and pressure conditions, said processing elements being arranged in succession to communicate with each other along an operational path for providing a continuously processing system between an entrance section of a first processing element and an exit section of a last processing element, the product packages being fed at said entrance section of the first processing element, transferred for treatment along said operational path between successive processing elements and extracted after treatment at said exit section of the last processing element;

pressure sealing devices provided at said entrance and exit sections of the first and final processing elements and between every two communicating processing elements, said pressure sealing devices being selectively operable in any of an opened and closed position for allowing product package feeding, transferring and extraction, respectively into, between and from said processing elements;

conveyor means disposed with respect to said processing elements for feeding into, transferring between and extracting from said processing elements said product packages;

temperature and pressure varying devices coupled to said processing elements for varying internal temperature independently in each of said processing elements, and for varying the ambient pressure processing in each element as a function of temperatures reached by products therein under treatment, said temperature and pressure varying devices comprising microwave generators arranged in staggered longitudinal or circumferential rows and coupled to the inside of at least one of said processing elements, and comprising pressurized fluid devices for controlling introduction into, and discharge of pressurized fluid from each of said processing elements, and said temperature and pressure varying devices being operable to balance pressure and temperature values between two successive processing elements for transfer of the products under treatment from a processing element to a successive one along said operational path.

2. The plant of claim 1, wherein said processing elements include tubular elements and pressure sealing devices between two consecutive tubular elements which in the closed positions define a microwave resonant chamber.

3. A plant, as claimed in claim 2 including a group of three tubular elements arranged in series.

4. A plant, as claimed in claim 3, including a number of groups of tubular elements, each group including three tubular elements arranged in series, and said conveyor means includes a switching device arranged to feed said groups of tubular elements in parallel with the products within respective sealed packages to be treated.

5. A plant, as claimed in claim 3, wherein said group of three tubular elements comprises a first tubular element including three cylindrical tubular sections, and includes a pressure transducer and a pressure control value coupled to the pressure transducer and to said first tubular element for supplying pressurized air thereto, and includes a discharge valve including two safety manostats for controlling, respectively, minimum and maximum pressure coupled to said first tubular element for selectively decompressing said first tubular element.

6. A plant, as claimed in claim 5, further comprising a pressurized water vapour distribution tube equipped with nebulizer nozzles disposed for distributing water vapour inside said first tubular element, said distribution tube being supplied through a pipe equipped with a flow control valve operated in response to a temperature sensor.

7. A plant, as claimed in claim 3, wherein a group of three tubular elements constitutes a second segment including three cylindrical tubular sections, and said conveyor means includes a conveyor device disposed within said tubular elements and made of materials transparent to microwaves.

8. A plant, as claimed in claim 7, wherein the second of the three tubular elements is equipped with a number of microwave generators, each including a wave guide outlet coupled inside the second tubular element, and all arranged in staggered longitudinal or circumferential rows.

9. A plant, as claimed in claim 8, wherein said second tubular element is equipped with a pressurized water vapour distribution tube with nebulizer nozzles and including a flow control valve operated in response to a temperature sensor for distributing water vapour inside said second tubular element.

10. A plant, as claimed in claim 3, wherein said group of three tubular elements constitutes a third segment including three cylindrical tubular sections, and said temperature and pressure varying means includes a pressure control valve and a pressure transducer coupled to said third segment for supplying pressurized air thereto, and a discharge valve under control of two safety manostats for controlling, respectively, minimum and maximum pressures disposed for selectively decompressing said third segment.

11. A plant, as claimed in claim 10, further comprising a cooling device inserted inside said third tubular element and including a tube for sprinkling cooling water on the sealed packages with the products to be treated contained therein, and including a reservoir at the base of said third tubular element for collecting the cooling water sprinkled on the sealed packages.

12. A plant, as claimed in claim 2, including a group of four tubular elements arranged in series.

13. A plant, as claimed in claim 12, including a number of groups of tubular elements, each group including four tubular elements arranged in series, said groups of tubular elements being fed in parallel with the products within respective sealed packages to be treated by means of said conveyor means conveyor which are equipped with a switching device.

14. A plant, as claimed in claim 12, wherein said group of four tubular elements comprises a first tubular element including three cylindrical tubular sections,
said conveyor means comprising a conveyor device made of materials transparent to microwaves, and said temperature and pressure varying means including a pressure control valve linked to a pressure transducer and inserted in a tubing for supplying pressurized air to said first tubular element, and a discharge valve inserted in a pressurized air discharge pipe for decompression of said first tubular element, said discharge valve being linked to two safety manostats, respectively, for minimum and maximum pressure.

15. A plant, as claimed in claim 14, wherein said first tubular element is equipped with a number of microwave generators, arranged in staggered longitudinal or circumferential rows whose wave guides open out inside the tubular element.

16. A plant, as claimed in claim 15, wherein said first tubular element is equipped with a pair of cooling channels, communicating with the inside of the first tubular element, each of which is equipped with a heat exchanger and a fan, said heat exchanger being supplied with refrigerating fluid whose flow is controlled by a valve.

17. A plant, as claimed in claim 12, wherein said group of four tubular elements comprises a second tubular element including three cylindrical tubular sections,
said conveyor means comprising a conveyor device made of materials transparent to microwaves, and said temperature and pressure varying means including a pressure control valve linked to a pressure transducer and inserted in a tubing for supplying pressurized air to said second tubular element, and a discharge valve inserted in a pressurized air discharge pipe for decompression of said second tubular element, said discharge valve being linked to two safety manostats, respectively, for minimum and maximum pressure.

18. A plant, as claimed in claim 17, wherein said second tubular element is equipped with a number of microwave generators, arranged in staggered longitudinal or circumferential rows whose wave guides open out inside the tubular element.

19. A plant, as claimed in claim 18, wherein said second tubular element is equipped with a pair of channels communicating with the inside of the second tubular element, each channel being equipped with a device for heating the air and an air circulation fan.

20. A plant, as claimed in claim 12, wherein said group of four tubular elements comprises a third tubular element including three cylindrical tubular sections,
said conveyor means comprising a conveyor device made of materials transparent to microwaves, and said temperature and pressure varying means including a pressure control valve linked to a pressure transducer and inserted in a tubing for supplying pressurized air to said third tubular element, and a discharge valve inserted in a pressurized air discharge pipe for decompression of said third tubular element, said discharge valve being linked to two safety manostats, respectively, for minimum and maximum pressure.

21. A plant, as claimed in claim 20, wherein said third tubular element is equipped with a number of microwave generators arranged in staggered longitudinal or circumferential rows and including wave guide outlets coupled inside the tubular element.

22. A plant, as claimed in claim 21, wherein said third tubular element is equipped with a pair of channels communicating with the inside of the third tubular element, each channel being equipped with a device for heating the air and an air circulation fan.

23. A plant, as claimed in claim 12, wherein said group of four tubular elements comprises a fourth tubular element including three cylindrical tubular sections,
said conveyor means comprising a conveyor device, and said temperature and pressure varying means including a pressure control valve linked to a pressure transducer and inserted in a tubing for supplying pressurized air to said fourth tubular element, and a discharge valve inserted in a pressurized air discharge pipe for decompression of said fourth tubular element, said discharge valve being linked to two safety manostats, respectively, for minimum and maximum pressure.

24. A plant, as claimed in claim 23, wherein said fourth tubular element is equipped with a pair of cooling channels communicating with the inside of the fourth tubular element, each channel being equipped with a heat exchanger and a fan, said heat exchanger being supplied with refrigerating fluid whose flow is controlled by a value.

25. The plant of claim 1, wherein said pressurized fluid is any of pressurized water vapor and compressed air.

26. A plant, as claimed in claim 1, further comprising elements for screening from the microwaves the sides of the sealed packages containing the products to be treated.

27. A plant for treating food products within respective sealed packages comprising:

a plurality of processing elements being each separately operable under different temperature and pressure conditions, said processing elements being arranged in succession to communicate with each other along an operational path for providing a continuously processing system between an entrance section of a first processing element and an exit section of a last processing element, the product packages being fed at said entrance section of the first processing element, transferred for treatment along said operational path between successive processing elements and extracted after treatment at said exit section of the last processing element;

pressure sealing devices provided at said entrance and exit sections of the first and final processing elements and between every two communicating processing elements, said pressure sealing devices being selectively operable in any of an opened and closed position for allowing product package feeding, transferring and extraction, respectively into, between and from said processing elements, each said processing element being tubular and defining with two consecutive said pressure sealing devices in the closed position a microwave resonant chamber;

conveyor means disposed with respect to said processing elements for feeding into, transferring between and extracting from said processing elements said product packages; and temperature and pressure varying devices for varying internal ambient pressure and temperature independently in each of said processing elements, with the processing element ambient pressure variations being adjustable as a function of temperatures reached by the products under treatment in such processing element, said temperature and pressure varying devices being operable to balance pressure and temperature values between two successive processing elements for transfer of the products under treatment from a processing element to a successive one along said operational path.

28. The plant of claim 27, comprising a group of at least three tubular elements arranged in series, said conveyor means is disposed within a tubular element and is made of materials transparent to microwaves, and said temperature and pressure varying means including a number of microwave generators arranged in staggered longitudinal or circumferential rows including wave guide outlets coupled inside at least one of said tubular elements, a number of channels communicating with the inside of at least one of said tubular elements, each of the number of channels including a fan and a heater for heating and circulating air in the channel, a pressure control valve and a pressure transducer coupled for supplying pressurized air to at least one of said tubular elements, and a discharge valve under control of two safety manostats for controlling, respectively, minimum and maximum pressures and disposed for selectively decompressing at least one of said tubular elements.

29. The plant of claim 27, wherein said conveyor device is actuatable to oscillate back and forth said product packages under treatment at least in said first processing element.

30. A plant for treating food products within respective sealed packages comprising:

a plurality of processing elements being each separately operable under different temperature and pressure conditions, said processing elements being arranged in succession to communicate with each other along an operational path for providing a continuously processing system between an entrance section of a first processing element and an exit section of a last processing element, a series of product packages being fed at said entrance section of the first processing element, transferred for treatment along said operational path between successive processing elements and extracted after treatment at said exit section of the last processing element;

pressure sealing devices provided at said entrance and exit sections of the first and final processing elements and between every two communicating processing elements, said pressure sealing devices being selectively operable in any of an opened and closed position for allowing feeding and transferring and extraction of each of the series of product packages, respectively, into between and from said processing elements, each said processing element being tubular and defining with two consecutive ones of said pressure sealing devices in the closed position a microwave resonant chamber;

conveyor means for feeding into, transferring between and extracting from said processing elements each of said series of said product packages;

temperature and pressure varying devices for varying internal ambient pressure and temperature independently in each of said processing elements, with the processing element ambient pressure variation being adjustable as a function of temperatures reached by the products under treatment in such processing element, wherein said temperature and pressure varying devices are independently and controllably operable both to balance pressure and temperature values between two successive processing elements for transfer of each of the series of product packages under treatment from a processing element to a successive one along said operational path, and to reduce pressure in said first and last processing elements to atmospheric pressure for feeding into the first processing element a series of product packages to be treated and for extracting from the last processing element a treated series of product packages.

* * * * *